United States Patent
Corker

[15] 3,642,344
[45] Feb. 15, 1972

[54] OPTICAL SCANNER HAVING HIGH-FREQUENCY TORSIONAL OSCILLATOR

[72] Inventor: William R. Corker, Waltham, Mass.
[73] Assignee: Honeywell, Inc., Minneapolis, Minn.
[22] Filed: Nov. 27, 1970
[21] Appl. No.: 93,080

[52] U.S. Cl. ................................. 350/6, 178/7.6, 250/235, 310/36, 350/285
[51] Int. Cl. .................................................... G02b 17/06
[58] Field of Search ................... 350/6, 7, 285; 178/7, 6; 250/234, 235; 310/36

[56] References Cited

UNITED STATES PATENTS

| | | | |
|---|---|---|---|
| 3,020,414 | 2/1962 | McKnight et al. | 350/6 X |
| 3,166,683 | 1/1965 | Gootherts | 350/6 X |
| 3,234,844 | 2/1966 | Fain et al. | 350/6 |

Primary Examiner—David Schonberg
Assistant Examiner—John W. Leonard
Attorney—Charles J. Ungemach, Ronald T. Reiling and George W. Field

[57] ABSTRACT

A high-frequency torsional oscillator for use in an optical scanner assembly, including a torsion rod whose ends are connected to a frame through a pair of flexural members which have lower torsional spring constants than the torsion rod. A mirror is attached to the torsion rod near its center, and a pair of rotors are attached to the torsion rod near its ends. Electromagnetic drivers are positioned near the rotors for imparting oscillatory motion thereto when the drivers are energized with a sinusoidally varying current. A phase-lock loop feedback system is used to drive the torsion rod assembly at a resonant frequency so that the mirror and the rotors oscillate with opposite phase, causing a pair of nodes to appear on the torsion rod between the mirror and the rotors.

3 Claims, 2 Drawing Figures

OPTICAL SCANNER HAVING HIGH-FREQUENCY TORSIONAL OSCILLATOR

BACKGROUND OF THE INVENTION

This invention relates generally to mechanical oscillators, and more particularly to three mass torsional oscillating systems.

Mechanical oscillators have been employed extensively in the prior art in conjunction with optical or infrared scanners. Generally in such scanners an objective lens focuses an image of a target on a light or infrared sensor, as the case may be, or upon an array of such sensors. A mirror is placed in the focusing beam for reflecting energy from the objective lens onto the sensor or sensors, which is generally in the image plane of the objective lens. Conversely, the mirror can be used to relay a light beam through an optical exit pupil for visual observation. In either case the mirror is set into oscillation so as to scan the image. In some such systems, the mirror is caused to oscillate about a single axis, while in other systems the mirror is caused to oscillate about two axes. In a scanning system employing two axes, usually the mirror is caused to oscillate at a relatively high frequency about one axis, and relatively low frequency about the other axis. It has generally proved to be more difficult to build a satisfactory mechanical oscillator for the high-frequency axes than for the low-frequency axis.

One type of prior art torsional oscillator for use in the high-frequency axis of an optical scanner comprises a torsion rod having a mirror mounted on its center, and armatures or rotors of electromagnetic driving devices at its ends. The electromagnetic driving devices are energized at the resonant frequency of the system so as to excite large amplitude oscillations of the mirror. At the resonant frequency of such a system, a mirror oscillates with phase opposite the phase of the two rotors, so that nodes occur on the torsion rod on either side of the mirror between the mirror and the rotors. In this type of prior art device, the torsion rod assembly is supported by annular clamps which are placed at the nodes of the torsion rod.

The prior art oscillator described in the preceding paragraph has been found to suffer from several disadvantages. One of these is some damping of the oscillations of the torsion rod due to the fact that the annular supporting clamps, no matter how small, must necessarily be wider than the infinitely thin nodal point on the rod. Damping leads to reduced oscillating amplitudes, higher driving power requirements, and higher levels of vibration transmitted through the supporting clamps to the device on which scanning assembly is mounted. To minimize these effects, the supporting clamps must be very accurately located at the nodes. However, it is very difficult to do this because the locations of the nodes can vary with changes in temperature.

To overcome these and other disadvantages, applicant has provided a new and improved torsional oscillation system suitable for use on a high-frequency optical scanner. According to the applicant's invention, an optical scanner is provided which is capable of oscillating a relatively large mirror at high frequency, over a wider range of operating conditions and with less vibrational energy being lost to the support structure than with prior art scanners under the same conditions. It is also possible to use a higher driver inertia with the nodes adjacent to the drivers. This cannot be done in prior oscillators because space must be allowed for supporting clamps to be mounted.

SUMMARY OF THE INVENTION

According to the present invention there is provided a three-mass torsional oscillating system comprising a torsion rod, a load member, and a pair of counterload members. The load member is secured to the torsion rod at a location between its ends, and the counterload members are secured to the torsion rod between the load member and the ends of the torsion rod. The ends of the torsion rod are secured to supports by flexural members which have torsional spring constants lower than that of the torsion rod. When the system is in oscillation at a resonant frequency, the load member oscillates with a phase opposite the phase of the counterload members, thereby creating a pair of nodes on the torsion rod between the load member and the counterload members.

DESCRIPTION OF THE PREFERRED EMBODIMENT

Figure 1:
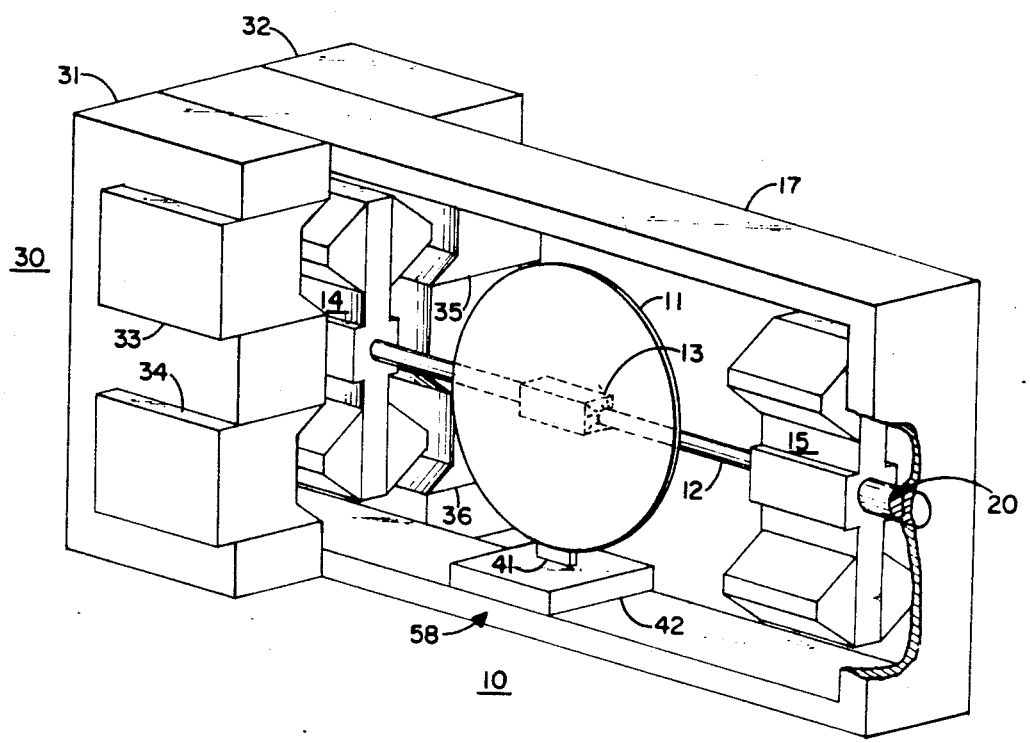
FIG. 1 is a view of an optical scanner which incorporates the present invention.

In FIG. 1, reference numeral 10 generally designates a high-frequency optical scanner according to the present invention. In optical scanner 10, mirror 11 is provided for reflecting a beam of light or infrared energy directed towards it by a suitable source, not shown. Mirror 11 is secured to a torsion rod 12 for oscillation about the axis defined by torsion rod 12, thereby to scan such beam of light or infrared energy. Torsion rod 12 comprises a circular cylindrical rod having an enlarged central portion 13. Torsion rod 12 is preferably fabricated from a single solid piece of metal chosen for its resilience and resistance to fatigue. Mirror 11, which comprises a flat disc having a highly polished and reflective surface, is secured to the enlarged central portion 13 of torsion rod 12 by adhesives or other suitable means. It is important that mirror 11 be very securely mounted to torsion rod 12, because the high frequency and large amplitude through which mirror 11 is to be oscillated requires a strong mechanical attachment.

Near the ends of torsion rod 12 are mounted rotors 14 and 15, respectively. In the preferred embodiment, torsion rod 12 extends through holes drilled into rotors 14 and 15, and the rotors are rigidly secured to torsion rod 12 by means of adhesives or other suitable means. At the tips of rotors 14 and 15, on either side thereof are mounted ferrite or soft magnetic pieces 16, whose function will be explained in a subsequent paragraph.

A frame 17 is provided for supporting torsion rod 12. In FIG. 1, the portion of frame 17 nearest rotor 15 has been cut away to show the manner in which torsion rod 12 is supported by frame 17. The other end of torsion rod 12, to which rotor 14 is attached, is supported by frame 17 in an identical manner as the end which is shown. The end of torsion rod 12 which extends through rotor 15 is secured, by adhesives or other suitable means, to one end of a flexural member 20, the other end of which is likewise secured to frame 17. The purpose of flexural member 20 (and the other flexural member at the other end of torsion rod 12, not shown) is to hold torsion rod 12 securely to frame 17 so as to prevent any motion of torsion rod 12 axially or laterally of the axis defined by torsion rod 12, but to permit rotational movement about the axis. It is essential for proper operation of the present invention that the torsional spring constant of flexural members 20 is less than the torsional spring constant of torsion rod 12. In fact, for best operation of the invention, it is preferable that the torsional spring constant of flexural member 20 be many times smaller than the torsional spring constant of torsion rod 12. In one high-frequency optical scanner built according to the present invention, Bendix Free-Flex Pivots were found to perform satisfactorily used as flexural members 20.

Electromagnetic driving means 30 is provided adjacent rotor 14 for imparting oscillatory motion thereto. It will be appreciated that in the preferred embodiment, means identical to electromagnetic driving means 30 is positioned adjacent rotor 15, but has been omitted from the drawing of FIG. 1 for purposes of clarity. However, the following description applies equally to driving means for both rotors. Driver supporting members 31 and 32 are disposed adjacent rotor 14 on either side thereof, and are rigidly attached to frame 17 by suitable means, not shown. Drivers 33 and 34 are attached to driver support 31, and drivers 35 and 36 are attached to driver support 32, as shown. Each driver comprises a coil of wire wound around a ferromagnetic core, not shown.

In operation, half-wave sinusoidally varying electric currents are applied to the coils of drivers 33 and 36. The opposite half wave of the sinusoidally varying currents are then applied to the coils of drivers 34 and 35. In this manner, the drivers alternately attract the ferrite pieces 16 of rotor 14 and cause it to oscillate at the frequency of the applied current. It will be appreciated that drivers 33 through 36 do not actually touch rotor 14 and the entire assembly of torsion rod 12, mirror 11 and rotors 14 and 15 supported only at two places, namely at the ends of torsion rod 12 which are attached to frame 17 by flexural members 20. For best operation, drivers 33 through 36 should be positioned so that their ferromagnetic cores are as close as possible to ferrite pieces 16 of rotor 14 without actually touching them as the rotor oscillates, so as to provide magnetic coupling of high efficiency.

The assembly consisting of torsion rod 12, mirror 11, and rotors 14 and 15 comprises a three mass torsional oscillating system, in which the mirror is a load member, and the two rotors are counterload members. Such a system, when supported at its ends through its flexural members, has more than one resonant frequency. At the lowest such resonant frequency, torsion rod 12, mirror 11, and rotors 14 and 15 all oscillate as a unit, with all the flexing being done by flexural members 20, there being essentially no twisting of torsion rod 12. This resonant frequency is generally too low for use in an optical scanner. There is another resonant frequency which is considerably higher than the one just discussed. At that resonant frequency, the counterload members oscillate in phase with each other, and the load member oscillates 180° out of phase with the counterload members. In other words, as the two counterload members are moving through their at rest position in a clockwise direction, the load member is moving through its at rest position in a counterclockwise direction, and vice versa. It will be appreciated that in this resonance condition, two nodes will appear on the torsion rod, one on either side of the load member, between the load member and the counterload members. It will also be appreciated that the exact position of the nodes depends upon relative moments of inertia of the load member and the counterload members: the larger the moments of inertia of the counterload members, the closer the nodes move towards them. Likewise, it will be appreciated that the angular displacement through which the load member and the counterload members oscillate also depends upon their relative moments of inertia: the larger the moments of inertia of the counterload members with respect to the moment of inertia of the load member, the smaller the angular displacement of the counterload members will be, and the larger the angle of displacement of the load member will be.

In the high-frequency optical scanner of FIg. 1, the electrical signals applied to the drivers are of high enough frequency so as to cause the oscillating system to oscillate at the higher resonant frequency described above. Models have been built according to the present invention which operate at a scanning frequency of 1,000 cycles per second, in which the mirror has an angular amplitude of plus and minus 6°, while the rotors have an angular amplitude of only plus and minus 0.25°. These models have the important advantage of high scarning frequency, maximum scanning amplitude, and minimum rotor amplitude which leads to high efficiency and min..num transmittal of vibration to the frame.

Figure 2:
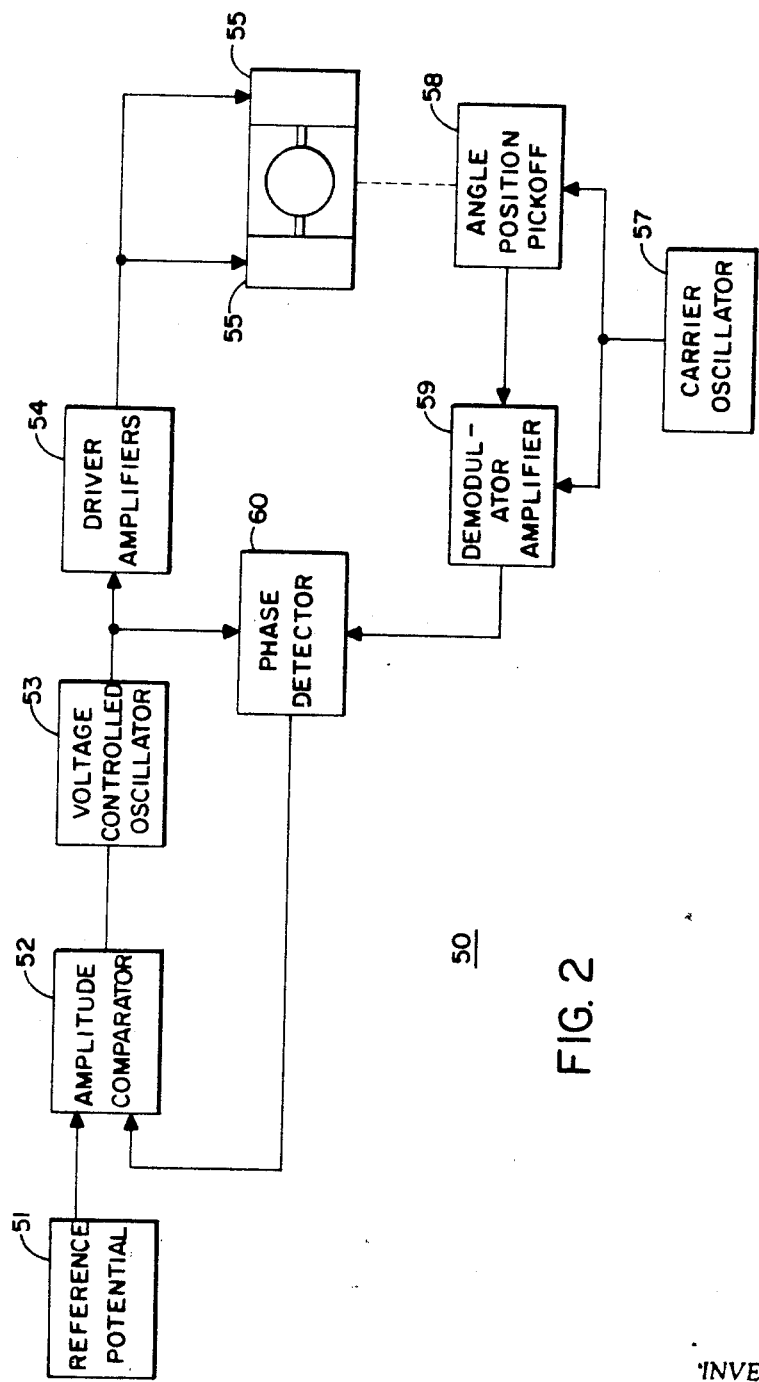
FIG. 2 is a schematic drawing of an electrical energization circuit for use in conjunction with the optical scanner of FIG. 1.

Electrical energization means suitable for driving the high-frequency optical scanner of FIG. 1 will now be described with reference to FIGS. 1 and 2. A simple regenerative feedback energization system as is used in many prior art scanners cannot be used with the optical scanner of FIG. 1 because of the lower resonant frequency has a higher amplitude than the preferred higher resonant frequency, and a regenerative feedback energization system would therefore serve only to excite and sustain the lower resonant frequency. Instead, it has been found advantageous to use a phase-lock loop. In FIG. 2, reference numeral 50 generally refers to electrical energization means for generating sinusoidally varying currents for driving the high-frequency optical scanner of FIG. 1. Reference numeral 51 designates a source of reference potential which is applied to an amplitude comparator 52. The output of amplitude comparator 52 is applied to a voltage controlled oscillator 53. The output signal of voltage controlled oscillator 53 is applied to driver amplifiers 54, the output from which is fed to the drivers of the high-frequency optical scanner, which in FIG. 2 are designated by reference numeral 55.

A carrier oscillator 57 is provided for supplying a carrier to an angle position pickoff 58 and a demodulator amplifier 59. The output from angle position pickoff 58 is also applied to demodulator amplifier 59. A phase detector 60 receives the output signal from demodulator amplifier 59, and also receives as a reference the output signal from voltage controlled oscillator 53. The output of phase detector 60 in turn supplied as a second input to amplitude comparator 52.

Angle position pickoff 58 is also shown in FIG. 1. It comprises a coil 42 which is mounted to frame 17 directly beneath mirror 11, and a ferrite pickoff 41 which is attached to the bottom edge of mirror 11 adjacent to pickoff coil 42. The inductance of pickoff coil 42 is caused to vary periodically according to the oscillatory motion of ferrite pickoff 41.

Referring again to FIG. 2, when optical scanner 10 is operating at resonance, the output of phase detector 60 is null, as will be explained later, so that the DC reference potential from reference potential source 51 which is applied to amplitude comparator 52 is passed on through to voltage-controlled oscillator 53. The characteristics of voltage-controlled oscillator 53 are such that its frequency of oscillation varies according to the magnitude of the applied DC control voltage. Accordingly, reference potential source 51 is selected so as to cause voltage controlled oscillator 53 to oscillate at the desired nominal resonant frequency of optical scanner 10.

Angle position pickoff 58 serves to measure the frequency and phase of scanner mirror 11 by modulating the carrier frequency supplied by carrier oscillator 57. This signal is then demodulated by demodulator amplifier 59, and applied to phase detector 60.

As in any oscillating system operating at resonance, when the optical scanner of FIG. 1 is oscillating exactly at its resonant frequency, the displacement lags the excitation by exactly 90°. Phase detector 60 operates to compare the phase of the demodulated signal from demodulator amplifier 59, which represents the scanner mirror position, and the excitation frequency from voltage controlled oscillator 53, which represents excitation phase. When the former signal lags the latter by exactly 90°, the output of phase detector 60 is null. If the oscillating frequency of the optical scanner departs from resonance, the output of phase detector 60 increases either positively or negatively from null. The polarity from the output from phase detector 60 indicates the direction of the frequency change. This output signal is then applied to amplitude comparator 52, and the DC reference voltage applied to voltage-controlled oscillator 53 is accordingly increased or decreased so as to trim the excitation frequency back to the resonant frequency of the optical scanner. In this manner, the optical scanner is automatically kept operating at its exact resonant frequency, and minor changes in the resonant frequency due to environmental effects such as temperature is automatically compensated for.

I claim as my invention:

3. A high frequency optical scanner comprising:
a frame;
a torsion rod;
a pair of flexural members resiliently connecting the ends of said torsion rod to said frame, said flexural members having torsional spring constants of lower magnitude than the spring constant of said torsion rod;
a mirror attached to said torsion rod at the center thereof;

a pair of rotors attached to said torsion rod near the ends thereof, said rotors having greater moments of inertia with respect to the axis of said torsion rod than said mirror; and, driving means mounted to said frame adjacent said rotors for imparting oscillatory motion thereto.

2. Apparatus according to claim 1 wherein said driving means comprises electromagnetic driving means.

3. Apparatus according to claim 2 further including electrical energization means connected to said electromagnetic driving means for supplying driving signals thereto so that said torsion rod is caused to oscillate at a resonant frequency whereat said mirror and said rotors oscillate with opposite phase so as to create a pair of nodes on said torsion rod between said mirror and said rotors, said mirror and said rotors oscillating with relative amplitudes which are inversely proportional to their moments of inertia with respect to said axis.

* * * * *